(12) United States Patent
Beser (10) Patent No.: US 7,529,943 B1
(45) Date of Patent: May 5, 2009

(54) SYSTEMS AND METHODS FOR END-TO-END RESOURCE RESERVATION AUTHENTICATION

(75) Inventor: Nurettin Burcak Beser, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 972 days.

(21) Appl. No.: 10/825,174

(22) Filed: Apr. 16, 2004

Related U.S. Application Data (60) Provisional application No. 60/463,006, filed on Apr. 16, 2003.

(51) Int. Cl.
*H04L 9/00* (2006.01)
*H04L 12/28* (2006.01)

(52) U.S. Cl. .................. 713/181; 370/236; 370/392

(58) Field of Classification Search .............. None
See application file for complete search history.

(56) References Cited

U.S. PATENT DOCUMENTS 6,515,966 B1 * 2/2003 Bardalai et al. ............ 370/236

2003/0223431 A1 * 12/2003 Chavez et al. .......... 370/395.42

OTHER PUBLICATIONS

Elizabeth Clark; The Resource Reservation Protocol; Network Magazine; Aug. 3, 2001; 5 pages.
Ed Braden et al.; Resource Reservation Protocol (RSVP); Request for Comments: 2205; Sep. 1997; 83 physical pages representing 112 numbered pages.
Louis Nicolas Hamer et al.; Session Authorization for RSVP; RAP Working Group; Feb. 2002; 19 physical pages representing 15 numbered pages.
Louis Nicols Hamer et al.; Framework for Session Set-Up with Media Authorization; RAP Working Group; Feb. 2002; 27 physical pages representing 25 numbered pages.
www.stardust.com; White Paper—QoS Protocols & Architectures; Jul. 8, 1999; pp. 1-25.
www.cisco.com; Resource Reservation Protocol; Internetworking Technologies Handbook; Feb. 20, 2002; 12 pages.

* cited by examiner

*Primary Examiner*—Brandon S Hoffman
(74) *Attorney, Agent, or Firm*—Harrity & Harrity, LLP (57) ABSTRACT

A network device constructs an outgoing resource reservation message and determines an authentication value, using, for example, a cryptographic algorithm and at least a portion of the outgoing message. The network device identifies a destination node for the message and inserts the authentication value in the message. The network device sends the message across a network to the destination node for authentication at the destination node using the authentication value.

23 Claims, 7 Drawing Sheets

SYSTEMS AND METHODS FOR END-TO-END RESOURCE RESERVATION AUTHENTICATION

CROSS REFERENCE TO RELATED APPLICATION

The instant application claims priority from provisional application No. 60/463,006, filed Apr. 16, 2003, the disclosure of which is incorporated by reference herein in its entirety.

BACKGROUND OF THE INVENTION

1. Field of the Invention

The present invention relates generally to networks, and more particularly, to systems and methods for resource reservation authentication in networks.

2. Description of Related Art

Existing packet-switched networks permit reliable, but not necessarily timely, communications between source nodes and destination nodes in the network. For many typical applications transmitting data across these networks, such reliable delivery is adequate. However, newer application types, such as videoconferencing, IP telephony, and other forms of multimedia communications, require data delivery that must be timely, but not necessarily reliable. To accommodate these performance requirements, various protocols, such as the Resource Reservation Protocol (RSVP), have been proposed to ensure an adequate quality of service (QoS) between source and destination nodes in a packet-switched network.

Existing resource reservation protocols, such as RSVP, include algorithms for authenticating the reservation messages. In RSVP, authentication is performed over each hop in the path between the source node and the destination node. Thus, the source node, destination node, and every node in the packet-switched network in between them, must authenticate every message sent between the source node and the destination node (i.e., perform point-to-point authentication). This requires that security relationships be established, and updated, between each and every node in the path between the source and destination nodes, thereby increasing the processing burden on each node in the network and slowing the reservation of resources that ensure adequate quality of service for transmissions between the source and destination nodes.

Therefore, there exists a need for systems and methods that permit authentication of resource reservations between source and destination nodes in a packet-switched network that reduces the processing burden on the nodes in the network and speeds the reservation of resources when employing resource reservation protocols.

SUMMARY OF THE INVENTION

Systems and methods consistent with the principles of the invention address this and other needs by implementing end-to-end resource reservation authentication. Using end-to-end, instead of point-to-point, resource reservation authentication, systems and methods consistent with the principles of the invention can reduce the processing burden on nodes in the network and speed the resource reservation process.

One aspect consistent with principles of the invention is directed to a method of authenticating a resource reservation message sent between a source node and a destination node in a network. The method may include constructing an outgoing resource reservation message, the message including multiple objects. The method may further include selecting multiple objects of the message and constructing a list identifying each of the selected multiple objects. The method may also include calculating a message integrity value using the selected multiple objects of the message and inserting the calculated integrity value and the constructed list in the message. The method may also include sending the message, from the source node, across a network to the destination node and authenticating the multiple objects of the message at the destination node using the message integrity value and the constructed list.

A second aspect consistent with principles of the invention is directed to a method of performing resource reservation authentication between a source node and a destination node in a network. The method may include constructing an outgoing resource reservation message and determining, at the source node, an authentication value using at least a portion of the message. The method may further include inserting the authentication value into the message and forwarding the message from the source node to the destination node across the network. The method may also include authenticating the message at the destination node using the authentication value.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention include mechanisms for implementing end-to-end resource reservation authentication, thereby, reducing the processing burden on nodes in the network and speeding the resource reservation process.

Exemplary Network

Figure 1:
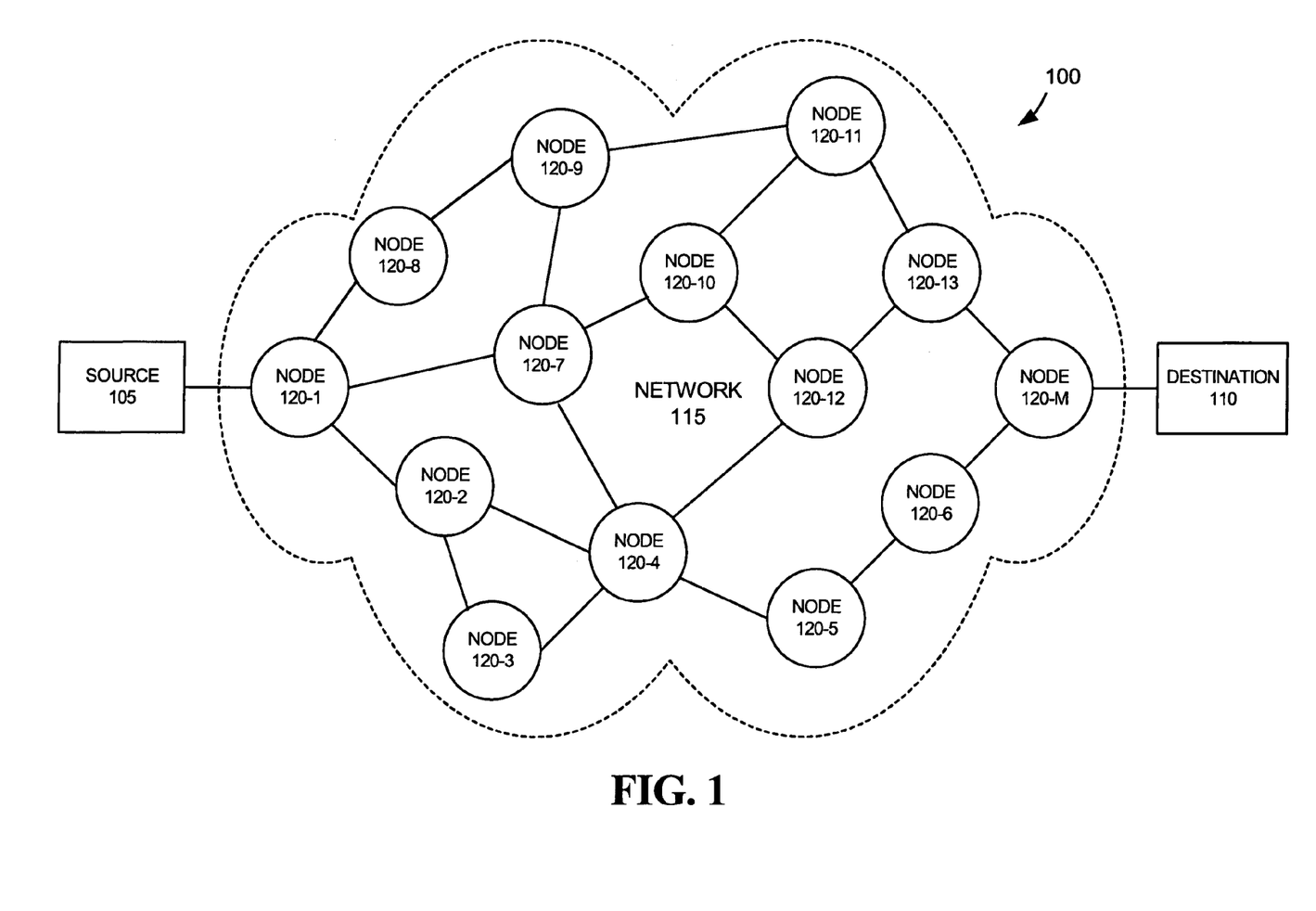
FIG. 1 is a diagram of a network consistent with the principles of the invention.

FIG. 1 illustrates an exemplary network 100 in which systems and methods consistent with principles of the invention may operate to perform end-to-end resource reservation. Network 100 may include a source node 105 and destination node 110 interconnected via a network 115. Source node 105 and destination node 110 may each include a host or a server. Source node 105 and destination node 110 may connect with network 115 with wired, wireless or optical connection links (not shown). Network 115 can include one or more networks of any type, including a local area network (LAN), metropolitan area network (MAN), wide area network (WAN), Internet, or Intranet. Network 115 may include multiple nodes 120-1 through 120-M (collectively referred to as nodes 120) for routing data through network 115. Each of nodes 120 may include a network device, such as a router, gateway, bridge, or the like.

It will be appreciated that the number of nodes illustrated in FIG. 1 are provided for explanatory purposes only. A typical network may include more or fewer nodes than are illustrated in FIG. 1.

Exemplary Node

Figure 2:
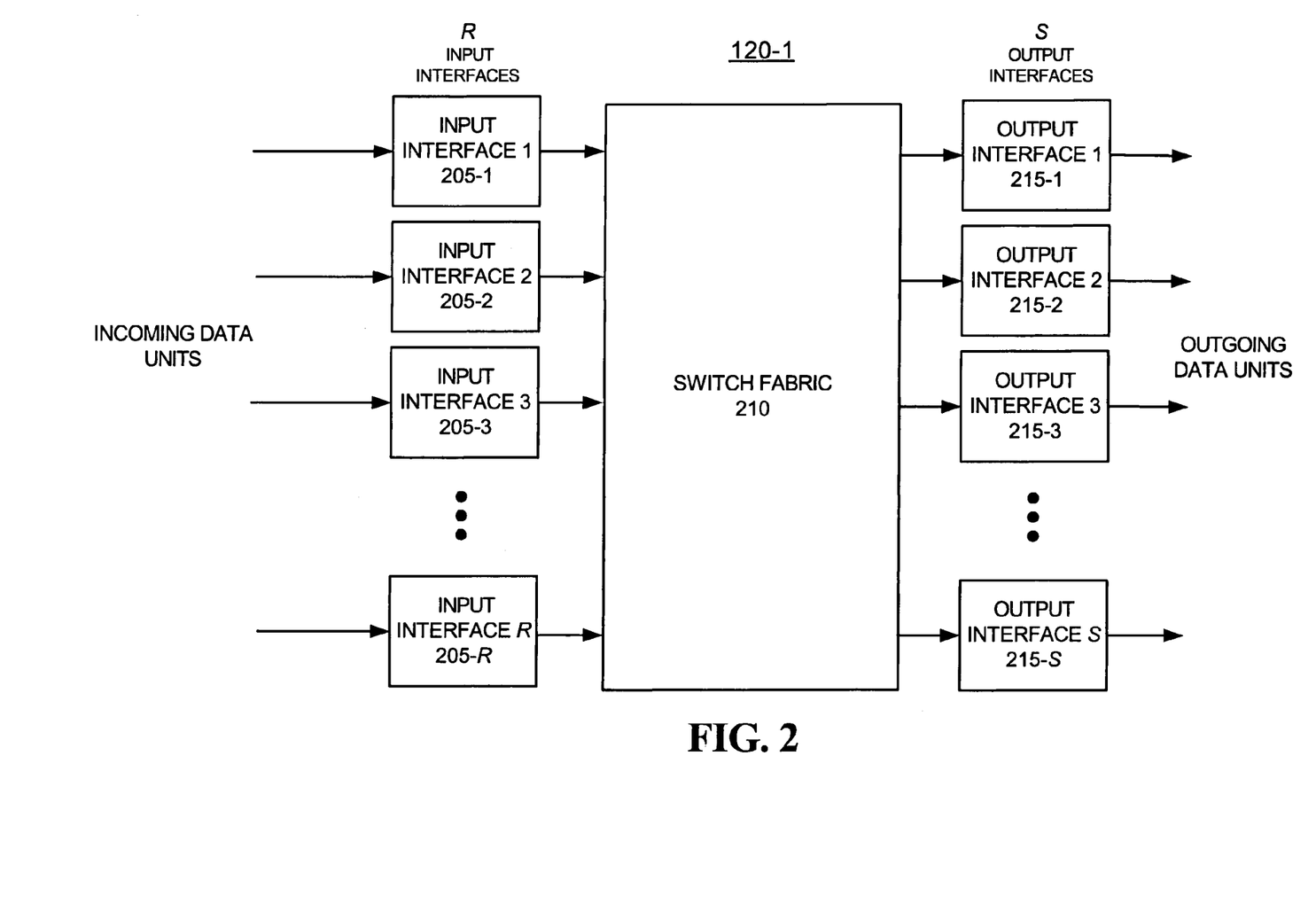
FIG. 2 is a diagram of an exemplary network node consistent with the principles of the invention.

FIG. 2 illustrates exemplary components of a network node, such as node 120-1, consistent with the principles of the invention. The other nodes 120 may be configured similarly. In general, node 120-1 receives incoming data units (e.g., any type of encapsulated data, including, for example, packets, cells, datagrams, fragments of packets, or fragments of datagrams or cells), determines the next destination (the next "hop" in network 115) for the data units, and outputs the data units as outbound data units on links that lead to the next destination. In this manner, data units "hop" from node to node in network 115 until reaching their final destination.

As illustrated, node 120-1 may include multiple input interfaces 205-1 through 205-R, a switch fabric 210 and multiple output interfaces 215-1-215-S. Each input interface 205 of node 120 may further include routing tables and forwarding tables (not shown). Through the routing tables, each input interface 205 may consolidate routing information learned from the routing protocols of the network. From this routing information, a routing protocol process (not shown) may determine the active route to network destinations, and install these routes in the forwarding tables. Each input interface 205 may consult a respective forwarding table when determining a next destination for incoming data units.

In response to consulting a respective forwarding table, each input interface 205 may either set up switch fabric 210 to deliver a packet to its appropriate output interface 215, or attach information to the packet (e.g., output interface number) to allow switch fabric 210 to deliver the packet to the appropriate output interface 215. Each output interface 215 may queue packets received from switch fabric 210 and transmit the packets on to a "next hop."

Exemplary Source/Destination Node

Figure 3:
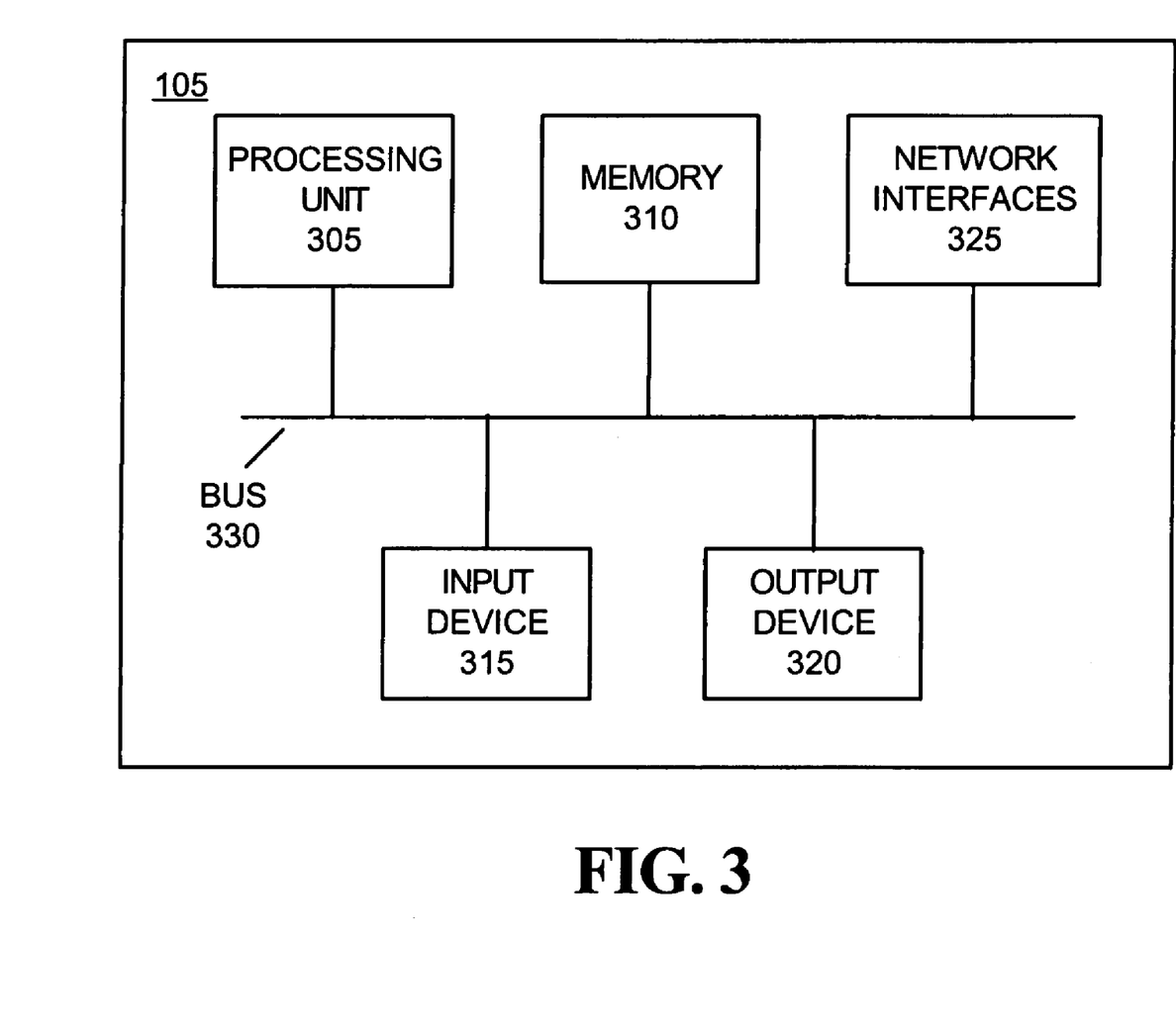
FIG. 3 is a diagram of an exemplary source/destination node consistent with the principles of the invention.

FIG. 3 illustrates exemplary components of source node 105 consistent with principles of the invention. Destination node 110 (not shown in FIG. 3) may be similarly configured. Source node 105 may include a processing unit 305, a memory 310, an input device 315, an output device 320, network interfaces 325, and a bus 330.

Processing unit 305 may perform all data processing functions for inputting, outputting, and processing of data. Memory 310 may include Random Access Memory (RAM) that provides temporary working storage of data and instructions for use by processing unit 305 in performing processing functions. Memory 310 may additionally include Read Only Memory (ROM) that provides permanent or semi-permanent storage of data and instructions for use by processing unit 305. Memory 310 can also include large-capacity storage devices, such as a magnetic and/or optical recording medium and its corresponding drive.

Input device 315 permits entry of data into source node 105 and may include a user interface (not shown). Output device 320 permits the output of data in video, audio, or hard copy format. Network interfaces 325 interconnect source node 105 with network 115. Bus 330 interconnects the various components of source node 105 to permit the components to communicate with one another.

Exemplary Resource Reservation Message

Figure 4:
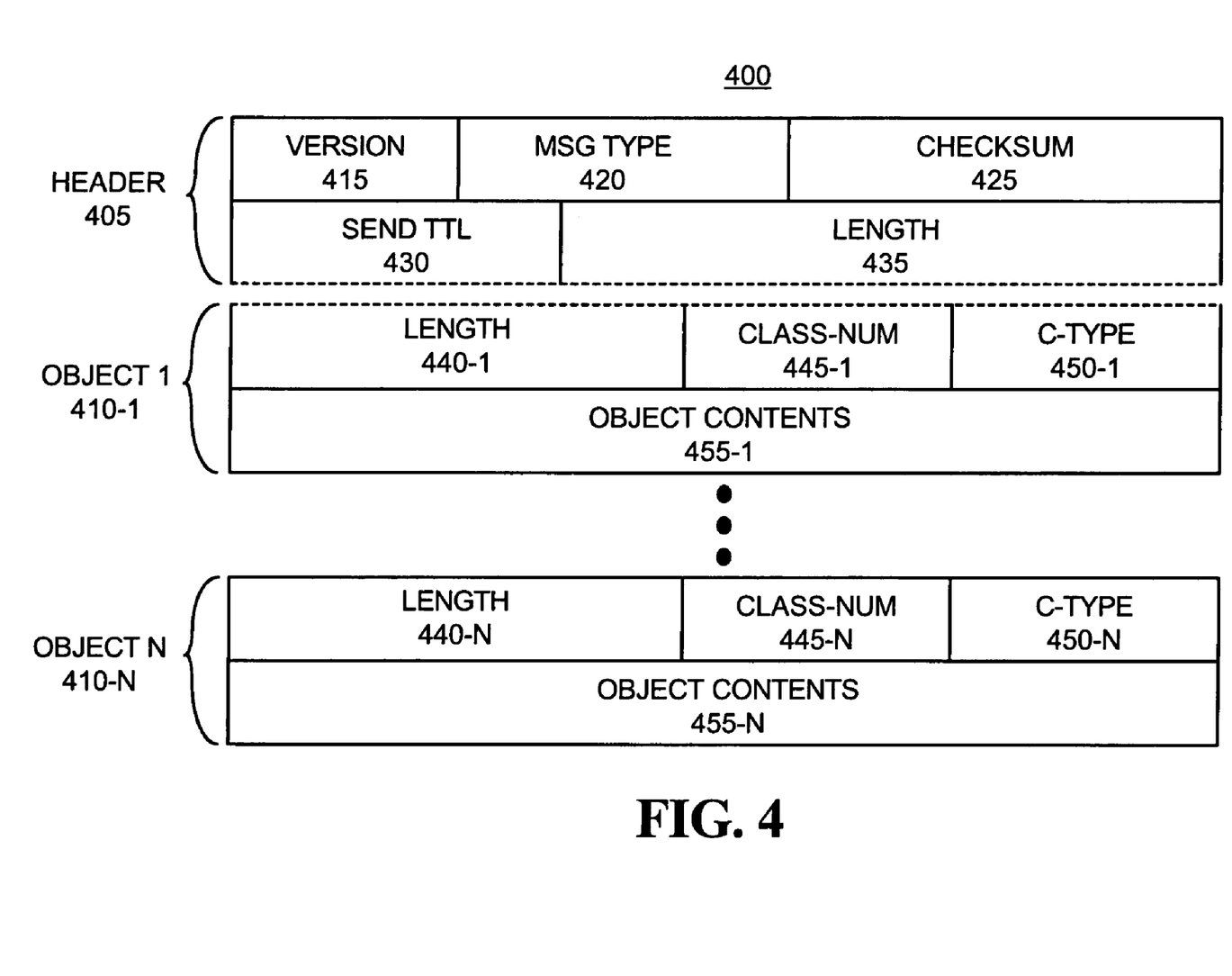
FIG. 4 is a diagram of an exemplary resource reservation message consistent with the principles of the invention.

FIG. 4 illustrates an exemplary format of a resource reservation message 400 consistent with principles of the invention. Message 400 may include a header 405 and one or more fields or "objects" (object 1 410-1 through object N 410-N). Header 405 may include a version identifier 415, message type 420, checksum 425, send time-to-live (TTL) 430, and length 435. Version identifier 415 may indicate a protocol version number. Message type 420 may indicate the type of message contained in message 400. A number of message types may be supported, depending on the resource reservation protocol being employed. For example, in accordance with RSVP, message type 420 may include the following integer values (as defined in RFC 2205):

| VALUE | MESSAGE TYPE |
| --- | --- |
| 1 | Path |
| 2 | Reservation-Request |
| 3 | Path-Error |
| 4 | Reservation-Request Error |
| 5 | Path-Teardown |
| 6 | Reservation-Teardown |
| 7 | Reservation-Request Acknowledgment |

Checksum 425 may include a conventional checksum value over the contents of message 400. Send TFL 430 may include, for example, an Internet Protocol (IP) time-to-live value with which message 400 was sent. Length 435 may include a value identifying the length of message 400, including header 405 and object 1 410-1 through 410-N, in appropriate units, such as, for example, bytes.

Objects 410-1 through 410-N may include a length value 440, a class number (class-num) 445, Class type (C-type) 450, and object contents 455. Length value 440 may specify the total length of the object in an appropriate unit, such as, for example, bytes. Class number 445 may identify the object class of the associated object. For example, in accordance with the Reservation Reservation Protocol (RSVP), class number 445 may include the following types of object classes (which are specified, for example, in RFC 2205):

| OBJECT CLASS | DESCRIPTION |
| --- | --- |
| Session | Contains the network address and, possibly, a destination port to define a specific session |
| Time Values | Contains values for the refresh period and the state TTL |
| Flow Specification | Defines a desired Quality of Service (QoS) (included in a reservation request message) |
| Filter Specification | Defines a subset of session-data units that should receive the desired QoS |
| Sender Template | Identifies the sender of the associated data unit |
| Sender TSPEC | Defines the traffic characteristics of the sender's data stream (included in a path message) |

-continued

| OBJECT CLASS | DESCRIPTION |
|---|---|
| Adspec | Carries advertising data in a path message |
| Error Specification | Specifies an error (included in a path-error or reservation-request error message) |
| Policy Data | Carries information that enables a local policy module to decide whether an associated reservation is administratively permitted |
| Integrity | Contains cryptographic data to authenticate the originating node and to verify the contents of the associated data unit |
| Scope | Specifies the scope for forwarding a reservation-request message |
| Reservation Confirmation | Carries the network address of a receiver that requested a confirmation (included in a reservation-request or reservation-request acknowledgment) |
| Originating RSVP Hop | Set to the network address of the entity that calculates the value of the integrity object |
| Destination RSVP Hop | Set to the network address of the entity that authenticates the value of the integrity object |

C-type 450 may be used with the associated class number 445 to define a unique type for each object 410. Object contents 455 may include data content that is appropriate for the type of object specified by the associated class number 445 and C-type 450 (as, for example, defined in RFC 2205).

Exemplary Object Picking for Authentication

Figure 5:
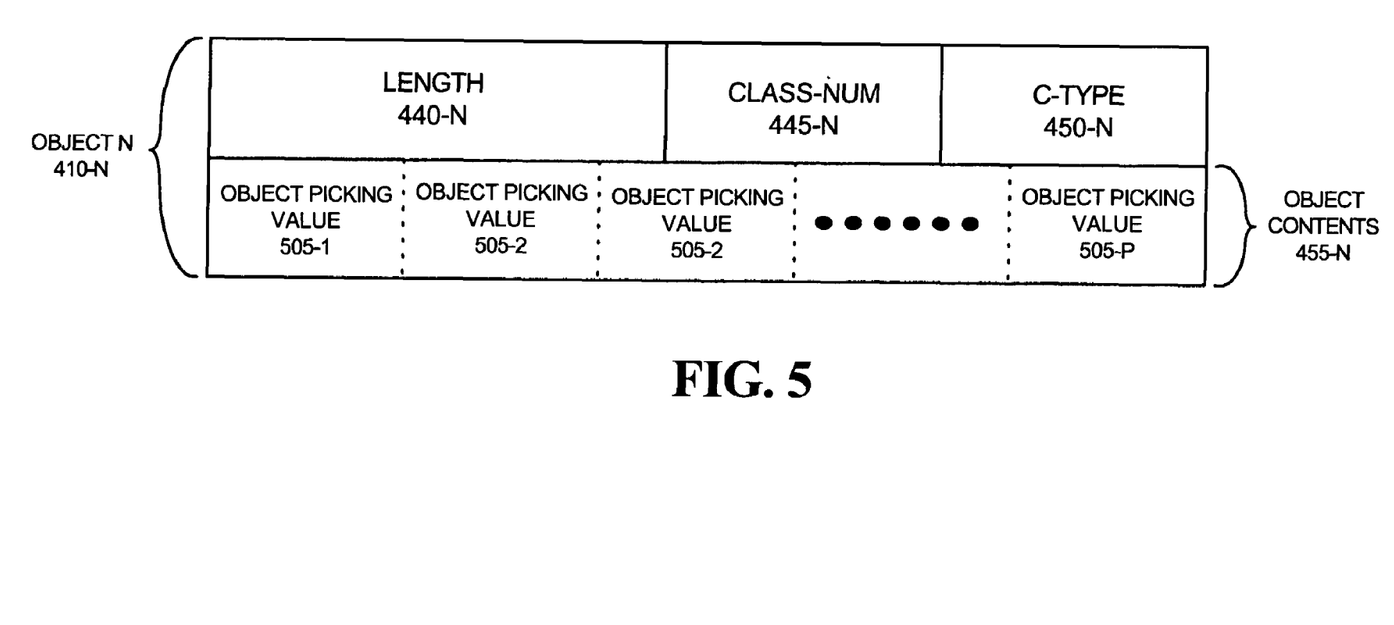
FIG. 5 is a diagram of exemplary object picking values consistent with the principles of the invention.

FIG. 5 illustrates an exemplary embodiment of object N 410-N for picking objects of message 400 that are to be used for calculating an integrity value used by source 105 and destination 110 for authenticating resource reservation messages sent between them. In addition to the length 440-N, class number 445-N and C-type 450-N values, which are also included in other objects, the object contents 455-N includes one or more object picking values 505-1 through 505-P, where P can be any positive integer. Object picking values 505-1 through 505-P may specify the objects 410 in data unit 400 the data of which is to be used for calculating an integrity value for the data unit. The objects 410 in data unit 400 that may be specified by object picking values, 505-1 through 505-P may include objects whose content will not change when data unit 400 traverses network 115 between source node 105 to destination node 110. The integrity value may be computed using, for example, hashing algorithms (e.g., MD5 message digest algorithm, secure hash algorithm (SHS), RIPEMD-160), message authentication codes (MACs), or Cyclical Redundancy Checking (CRC) algorithms, such as CRC-32. Additionally, the integrity object value may be calculated using conventional private or public key encryption algorithms, such as, for example, Data Encryption Standard (DES), RC5, CAST-128, RC2, or Blowfish algorithms. Object picking values 505-1 through 505-P may also specify the order in which objects 410 in data unit 400 are used in calculating the integrity value for the data unit 400. For example, object picking value 505-1 may indicate the object 410 in data unit 400 that is used first in calculating the integrity value, object picking value 505-2 may indicate the object 410 in data unit 400 that is used second in calculating the integrity value, etc. Object contents 455-N may additionally include an identifier (not shown) that may serve to identify at least one of the authentication endpoints. In one embodiment, for example, the identifier may include a source and/or destination network address of the authentication endpoints (e.g., source node 105 and destination node 110).

Exemplary End-to-End Resource Reservation Authentication Process

Figure 6:
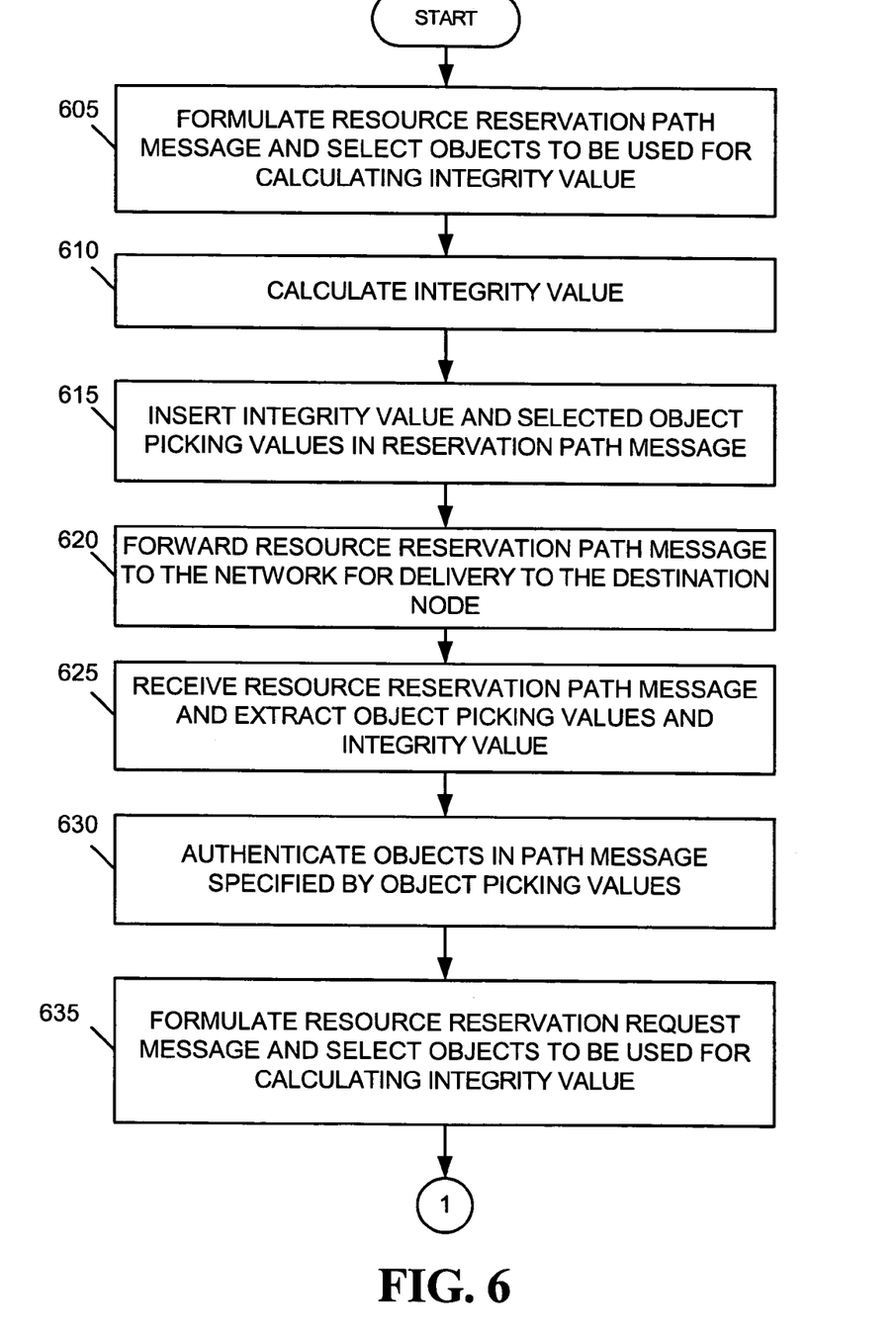
FIGS. 6-7 are flowcharts of an exemplary resource reservation authentication process according to an implementation consistent with principles of the invention.
Figure 7:
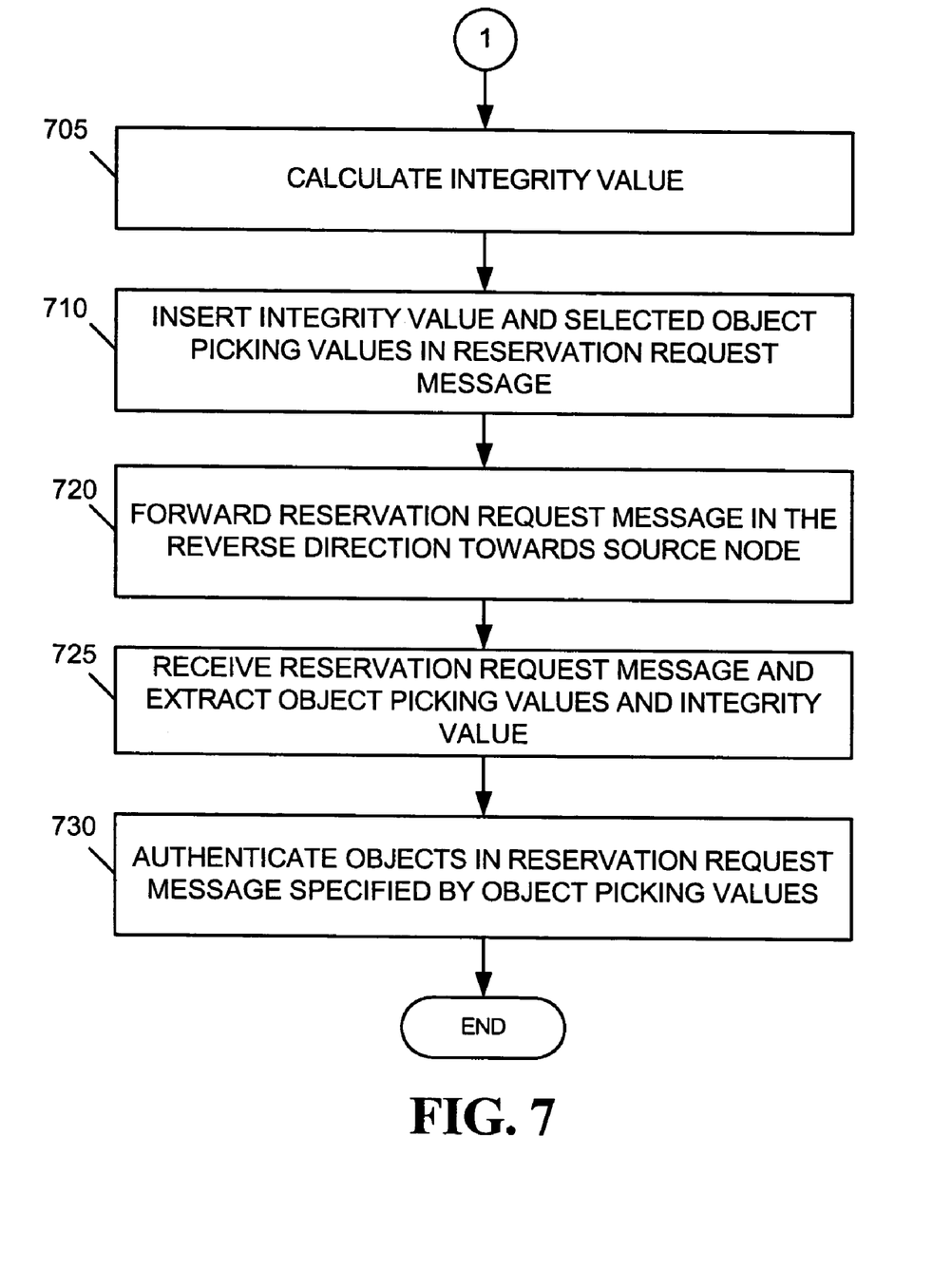

FIGS. 6-7 are flowcharts that illustrate an exemplary process, consistent with the principles of the invention, for end-to-end resource reservation authentication between a source node and a destination node in a packet-switched network. The exemplary process of FIGS. 6-7 may be stored as a sequence of instructions in memory 310 of source node 105 or destination node 110, as appropriate, and implemented by processing unit 205.

The exemplary process may begin with source node 105 formulating a resource reservation path message and selecting objects 410 to be used for calculating an integrity value [act 605]. Source node 105 may specify message type 420 of message 400 as a "path" message and populate appropriate fields of message 400, in accordance with conventional resource reservation protocols, such as, for example, RSVP (e.g., as specified in RFC 2205), for reserving resources and establishing a specified quality of service between source node 105 and destination node 110.

Source node 105 may select various objects 410 for calculating the integrity value. For example, if RSVP is employed, source node 105 may select the time value, sender template and sender TSPEC objects for calculating the integrity value. Optionally, an identifier, such as, for example, a source and/or destination network address, associated with the authentication endpoints (e.g., source node 105 and destination node 110), may be included with the various objects 410 to identify the various objects 410 and, in some embodiments, for possibly being using in calculating the integrity value. Source node 105 may then calculate the integrity value for the integrity object using the selected objects and, possibly, the identifier (e.g., the source and/or destination network addresses), as the input data for the calculation [act 610]. The integrity value may be calculated using, for example, hashing algorithms (e.g., MD5 message digest algorithm, secure hash algorithm (SHS), RIPEMD-160), message authentication code (MAC) algorithms, or Cyclical Redundancy Checking (CRC) algorithms, such as CRC-32. Alternatively, the integrity object value may be calculated using conventional private or public key encryption algorithms, such as, for example, Data Encryption Standard (DES), RC5, CAST-128, RC2, or Blowfish algorithms. Each of the object picking values 505, that specify the selected objects 410, may also specify the order in which the objects 410 are used in calculating the integrity value for the data unit 400. Source node 105 may insert the calculated integrity value and the selected objected picking values in the reservation path message 400 [act 615]. Optionally, source node 105 may additionally insert the identifier, that serves to identify at least one of the authentication endpoints, into message 400. In one embodiment, the source and destination network addresses, associated with the authentication endpoints (e.g., source node 105 and/or destination node 110) may serve as the identifier. Other identifiers, however, may alternatively be used. Source node 105 may then forward the resource reservation path message to network 115 for delivery to destination node 110 [act 620]. Nodes 120 of network 115 may process the reservation path message in accordance with the employed resource reservation protocol (e.g., RSVP) and forward the message towards destination 110 in accordance with conventional routing protocols. Each node 120 of network 115 that forwards the resource reservation path message may change the order of objects 410 identified in the object picking values 505 of object N 410-N of the message. Each node 120 of network 115 may also change the content of objects 410 not identified in the object picking values 505 of object 410-N of the resource reservation path message. Each node 120 of network 115 that forwards the resource reservation path message may further insert its own object picking values 505 and integrity value into message 400 to, for example, authenticate the message with a "next hop" node in the path between the source node 105 and the destination node 110.

Destination node 110 may receive the resource reservation path message from network 115 and extract the object picking values 505 and integrity value from object N 410-N [act 625]. Destination node 110 may then cryptographically authenticate the objects in the received reservation path message specified by the extracted object picking values 505 using the extracted integrity value [act 630].

Destination node 110 may then formulate a resource reservation request message and select objects 410 from the message to be used for calculating its own integrity value [act 635]. Destination node 110 may then calculate the integrity value using the selected objects as input data [act 705]. The integrity value may be calculated using, for example, hashing algorithms (e.g., MD5 message digest algorithm, secure hash algorithm (SHS), RIPEMD-160), message authentication code (MAC) algorithms, or Cyclical Redundancy Checking (CRC) algorithms, such as CRC-32. Alternatively, the integrity object value may be calculated using conventional private or public key encryption algorithms, such as, for example, Data Encryption Standard (DES), RC5, CAST-128, RC2, or Blowfish algorithms. Destination node 110 may then insert the calculated integrity value and the selected object picking values in the resource reservation request message [710]. Destination node 110 may forward the reservation request message in the reverse direction towards source node 105 [act 720]. Each node 120 of network 115, which processed the resource reservation path message sent from the source node 105, may process the reservation request message in accordance with the resource reservation protocol employed (e.g., RSVP) to establish the requested quality of service between source node 105 and destination node 110 and may forward the message towards source node 105 in accordance with conventional routing protocols.

Source node 105 may receive the reservation request message from network 115 and extract the object picking values and the integrity value [act 725]. Source node 105 may then cryptographically authenticate the objects in the reservation request message specified by the extracted object picking values, using the extracted integrity value, to complete the resource reservation authentication process [act 730].

CONCLUSION

Consistent with the principles of the invention, resource reservation messages transmitted between source and destination nodes in a network may be authenticated in an end-to-end fashion, instead of conventional point-to-point resource reservation authentication. Message integrity values may be calculated at the source and destination nodes, and not the intermediate hops of the intervening network, and authenticated at the source and destination nodes, instead of at every hop along the path between the source and destination node. End-to-end resource reservation authentication, consistent with the principles of the invention, thus serves to reduce the processing burden on nodes (e.g., routers) in the network and speeds the resource reservation process.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, while end-to-end resource reservation has been described consistent with the principles of the invention, one skilled in the art will recognize that the authentication technique may be employed at one or more intermediate network nodes, such that authentication occurs at more nodes than just the source and destination nodes, but at fewer than every node in the path between the source and destination nodes.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

While series of acts have been described in FIGS. 6-7, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method of authenticating a resource reservation message sent between a source node and a destination node in a network, comprising:
    constructing an outgoing resource reservation message, the message comprising a plurality of objects;
    selecting multiple objects of the message;
    constructing identification values identifying the selected multiple objects, the identification values including an ordered list;
    calculating a message integrity value using the selected multiple objects of the message, the calculating the message integrity value including:
        using the selected multiple objects in an order specified by the ordered list;
    inserting the calculated integrity value and the constructed identification values in the message;
    sending the message including the inserted integrity value and the identification values, from the source node, across a network to the destination node; and
    authenticating the multiple objects of the message at the destination node using the message integrity value and the constructed identification value.

2. The method of claim 1, further comprising:
    inserting a node identifier in the message, where the node identifier identifies either the source node or the destination node.

3. The method of claim 2, where calculating the message integrity value further comprises calculating the message integrity value using the node identifier.

4. The method of claim 2, where the node identifier comprises a network address associated with at least one of the source node or the destination node.

5. The method of claim 4, where calculating the message integrity value comprises calculating the message integrity value based on the network address.

6. The method of claim 1, where each of the plurality of objects comprises a field of the message.

7. The method of claim 1, where the message comprises at least one of a packet, a cell, a datagram, a fragment of a packet, a fragment of a datagram, or a fragment of a cell.

8. The method of claim 1, where the message comprises a Resource Reservation Protocol (RSVP) path message.

9. The method of claim 1, where the message comprises a Resource Reservation Protocol (RSVP) reservation request message.

10. The method of claim 1, where calculating the message integrity value comprises using a cryptographic algorithm.

11. The method of claim 10, where the cryptographic algorithm comprises at least one of an MD5 message digest algorithm, a secure hash algorithm (SHS), a RIPEMD-160 algorithm, a message authentication code (MAC) algorithm, a Cyclical Redundancy Checking (CRC) algorithm, a private key encryption algorithm, or a public encryption key algorithm.

12. The method of claim 1, further comprising: extracting, at the destination node, the identification values identifying the selected multiple objects from the message.

13. The method of claim 12, where authenticating the multiple objects of the message at the destination node using the message integrity value comprises:
authenticating the multiple objects of the message specified by the extracted identification values.

14. The method of claim 1, where the message is used by routers in the network for establishing a desired level of quality of service for transmissions between the source node and the destination node.

15. A system for performing resource reservation authentication in a network, comprising:
a source node comprising:
a processor to:
construct an outgoing resource reservation message, the message comprising a plurality of objects,
select multiple objects of the message,
construct a list identifying the selected multiple objects, where the list includes an ordered list,
calculate a message integrity value using the selected multiple objects and the constructed list, where when calculating the message integrity value, the processor is further to:
use the selected multiple objects in an order specified by the ordered list and
insert the calculated message integrity value and the constructed list in the message, and
a network interface to send the message across the network; and
a destination node comprising:
a network interface to receive the message, and
a processor to authenticate the message using the message integrity value and the constructed list.

16. A network device, comprising:
a memory configured to store instructions;
a processor configured to execute the instructions in the memory to:
construct an outgoing resource reservation message to reserve resources in a network between the network device and a destination node, the message comprising a plurality of objects,
select multiple objects of the plurality of objects of the message,
construct a list identifying the selected multiple objects, the list including an ordered list
calculate a message integrity value using the selected multiple objects of the message, where when calculating the message integrity value, the processor is further to:
use the selected multiple objects in an order specified by the ordered list and
insert the message integrity value and the constructed list into the message; and
a network interface to send the message across the network to the destination node for authentication of the network device at the destination node using the inserted message integrity value and the constructed list.

17. The device of claim 16, where each of the plurality of objects comprises a field of the message.

18. The device of claim 16, where the message comprises at least one of a packet, a cell, a datagram, a fragment of a packet, a fragment of a datagram, or a fragment of a cell.

19. The device of claim 16, where the message comprises a Resource Reservation Protocol (RSVP) path message.

20. The device of claim 16, where the message comprises a Resource Reservation Protocol (RSVP) reservation request message.

21. The device of claim 16, where the processor is further configured to calculate the message integrity value using a cryptographic algorithm.

22. The device of claim 21, where the cryptographic algorithm comprises at least one of a MD5 message digest algorithm, a secure hash algorithm (SHS), a RIPEMD-160 algorithm, a message authentication code (MAC) algorithm, a Cyclical Redundancy Checking (CRC) algorithm, a private key encryption algorithm, or a public encryption key algorithm.

23. The device of claim 16, where the message is used by routers in the network for establishing a desired level of quality of service for transmissions between the network device and the destination node.

* * * * *